(12) United States Patent
Xu et al.

(10) Patent No.: US 11,052,703 B2
(45) Date of Patent: Jul. 6, 2021

(54) WHEEL AND RIM WITH INNER FLANGE HAVING STRIP WEIGHT REDUCTION SOCKETS

(71) Applicant: CITIC Dicastal CO., LTD., Hebei (CN)

(72) Inventors: Zuo Xu, Qinhuangdao (CN); Guoyuan Xiong, Qinhuangdao (CN); Xu Wang, Qinhuangdao (CN); Zhen Li, Qinhuangdao (CN); Kaiqing Wang, Qinhuangdao (CN); Yule Zhou, Qinhuangdao (CN); Chuan Cheng, Qinhuangdao (CN); Changhai Li, Qinhuangdao (CN); Tiefeng Hu, Qinhuangdao (CN); Hui Chi, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 295 days.

(21) Appl. No.: 16/204,014

(22) Filed: Nov. 29, 2018

(65) Prior Publication Data

US 2019/0270338 A1 Sep. 5, 2019

(30) Foreign Application Priority Data

Mar. 5, 2018 (CN) .......................... 201820299235.9

(51) Int. Cl.
| | | |
|---|---|---|
| *B60B 21/10* | (2006.01) | |
| *B60B 21/02* | (2006.01) | |
| *B60B 3/00* | (2006.01) | |

(52) U.S. Cl.
CPC .......... *B60B 21/106* (2013.01); *B60B 21/023* (2013.01); *B60B 3/001* (2013.01); *B60B 3/002* (2013.01); *B60B 2360/104* (2013.01)

(58) Field of Classification Search
CPC ................ B60B 21/106; B60B 21/023; B60B 2900/111; B60B 3/001; B60B 3/002; B60B 2360/104
See application file for complete search history.

(56) References Cited

U.S. PATENT DOCUMENTS

| | | | |
|---|---|---|---|
| 2012/0286562 A1* | 11/2012 | Ono ...................... | B60B 21/026 301/95.101 |
| 2015/0210109 A1* | 7/2015 | Von Tardy-Tuch ....... | B60B 1/06 301/63.101 |
| 2017/0361646 A1* | 12/2017 | Davis ........................ | B60B 3/06 |
| 2019/0136349 A1* | 5/2019 | Breton .................... | C22C 21/04 |
| 2019/0277358 A1* | 9/2019 | Zelenak ................ | F16D 65/128 |

FOREIGN PATENT DOCUMENTS

FR 2986468 A1 * 8/2013 ............. B60B 21/12

* cited by examiner

*Primary Examiner* — Kip T Kotter
(74) *Attorney, Agent, or Firm* — Cooper Legal Group, LLC

(57) ABSTRACT

A rim with an inner flange having strip weight reduction sockets and a wheel are provided. The rim includes the inner flange, a middle portion and an outer flange which are all annular and are connected end to end to form an annular rim, in which trapezoidal weight reduction sockets are provided on the inner wall of the inner flange; the bottom edges of the weight reduction sockets are flush with the edge of the inner flange; the top edge of each weight reduction socket has fillets; and the weight reduction sockets have a bottom edge length of 5-30 mm, a height of 15-60 mm, a top edge length of 5-15 mm, a base angle of 72-83°, and a depth of 1-5 mm.

14 Claims, 4 Drawing Sheets

WHEEL AND RIM WITH INNER FLANGE HAVING STRIP WEIGHT REDUCTION SOCKETS

CROSS-REFERENCE TO RELATED APPLICATION

The present application claims benefit of Chinese Patent Application No. 201820299235.9, filed on Mar. 5, 2018, the contents of which are hereby incorporated by reference in its entirety.

BACKGROUND

With the increasing shortage of natural resources, the direction of development of modern automobile industry technology is to further reduce the weight of automobiles, reduce the consumption of fuels and reduce the emission of exhaust.

Aluminum alloy hubs have won the favor of more and more private car owners by attractive appearance, safety, comfort and other characteristics. The lightweight design of the inner flange of the aluminum alloy hub is to optimize the design of the inner flange structure under the predetermined use environment and load condition, thereby reducing the weight of the hub and meeting the reliability and basic performance of the hub.

Thus, it has been desirable in the art to balance the weight reduction and the mechanical strength by reducing the weight of the hub as much as possible on the premise that the strength of the aluminum alloy hub is ensured by a specific inner flange weight reduction design.

SUMMARY

The disclosure relates to the technical field of automobile parts, and specifically, relates to a weight reduction solution for an aluminum alloy hub with an inner flange having triangular weight reduction sockets.

The object of the disclosure is to provide a weight reduction solution for a hub with an inner flange having weight reduction sockets.

Unless otherwise stated, in the disclosure, "wheel" and "hub" are intended to express the same meaning, i.e., a wheel ring made of an aluminum alloy, including a wheel disc and a rim. The wheel disc and the rim may be combined by bolts, welding, snapping or other method, or integrally formed.

In one aspect of the disclosure, provided is a rim having a weight reduction inner flange, the rim being made of an aluminum alloy and including the inner flange, a middle portion and an outer flange which are all annular and are connected end to end to form an annular rim, in which trapezoidal weight reduction sockets are provided on the inner wall of the inner flange; the bottom edges of the weight reduction sockets are flush with the edge of the inner flange; the top edge of each weight reduction socket has fillets; and the trapezoidal weight reduction sockets have a bottom edge length of 5-30 mm, a height of 15-60 mm, a top edge length of 5-15 mm, a base angle of 72-83°, and a depth of 1-5 mm.

In a preferred aspect of the disclosure, the distance between the bottom edges of the weight reduction sockets is 15-25 mm.

In a preferred aspect of the disclosure, the weight reduction sockets are isosceles trapezoids in shape.

In a preferred aspect of the disclosure, the weight reduction sockets have a bottom edge length of 18 mm, a height of 34 mm, a top edge length of 8 mm, a base angle of 83°, and a depth of 3 mm.

In a preferred aspect of the disclosure, the weight reduction sockets extend from the flange along the undulation of the rim and reaches a flat region of the rim.

In a preferred aspect of the disclosure, the top edge of the weight reduction socket has fillets and the diameter of the fillets is 2-6 mm.

In a preferred aspect of the disclosure, the bottom surface and the edge of the weight reduction socket are connected by a plane.

In a preferred aspect of the disclosure, the rim is made of A356.2 aluminum alloy.

In another aspect of the disclosure, further provided is a wheel including the rim described above.

The weight of the hub is reduced by designing the weight reduction sockets in a specific shape for the inner flange of the hub and selecting the sizes of the weight reduction sockets. In addition, the hub which the weight thereof is reduced still has excellent mechanical properties, meets American Wheel Standards of SAE J175 and SAE J328-2005, namely meet the performance requirements for 13-degree impact strength, 90-degree impact strength, radial impact, radial fatigue and bending fatigue, and can also meet the requirements of GB/T 5334-2005 and GB/T 15704-1995 for wheel strengths and fatigues.

BRIEF DESCRIPTION OF DRAWINGS

The embodiments of the disclosure will be described in detail below in combination with the accompanying drawings, in which.

LIST OF REFERENCE SYMBOLS

11—rim, 12—flange plate, 13—spoke, 21—weight reduction socket, 22—fillet, 23—axially outer edge, 24—edge of the radially inner flange, 25—axially inner edge, L1—axially inner edge length, H1—depth, β—base angle, 43—radially outer flange, 44—middle portion, 26—radially inner flange, 27—radially inner wall, L2—distance between the axially outer edges of the weight reduction sockets, 41—undulation of the rim, 42—flat region, 31—axially outer surface, 32—edge of the weight reduction, 33—plane.

DETAILED DESCRIPTION

First Embodiment

Figure 1:
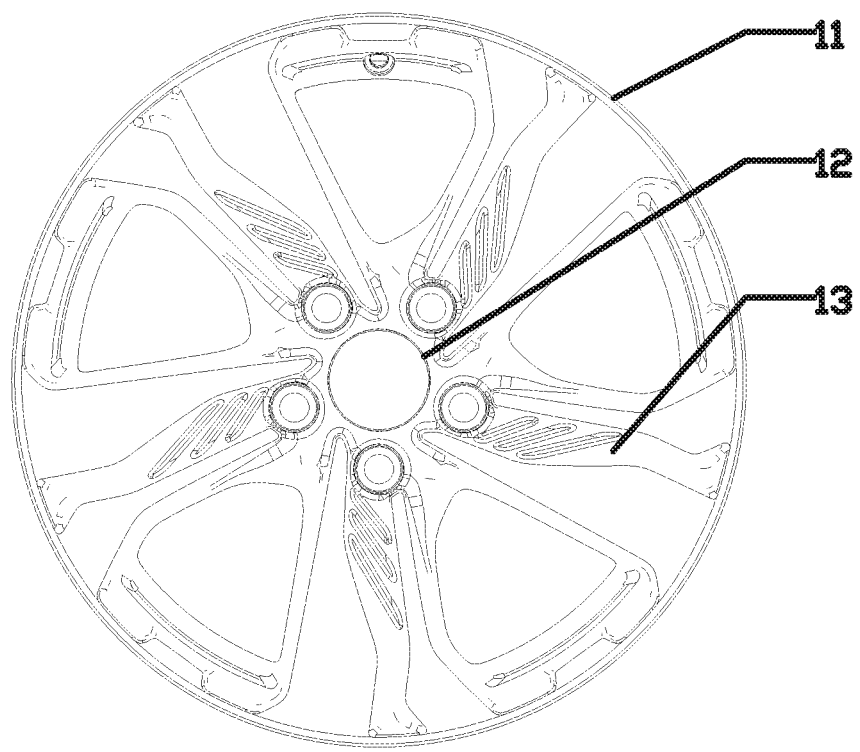
FIG. 1 is a schematic diagram of a front structure of a wheel according to first embodiment of the disclosure.
Figure 2:
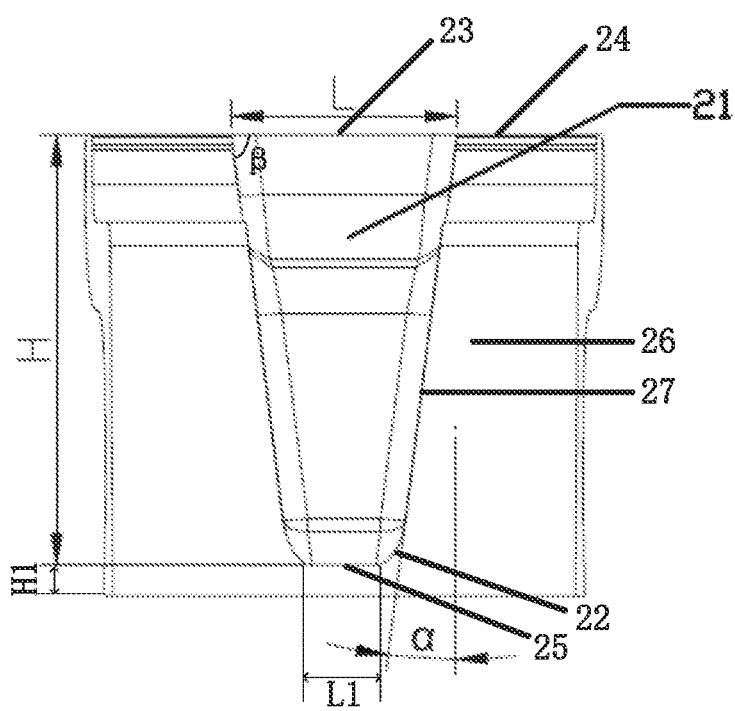
FIG. 2 is a structure diagram of an inner flange weight reduction socket according to first embodiment of the disclosure.
Figure 3:
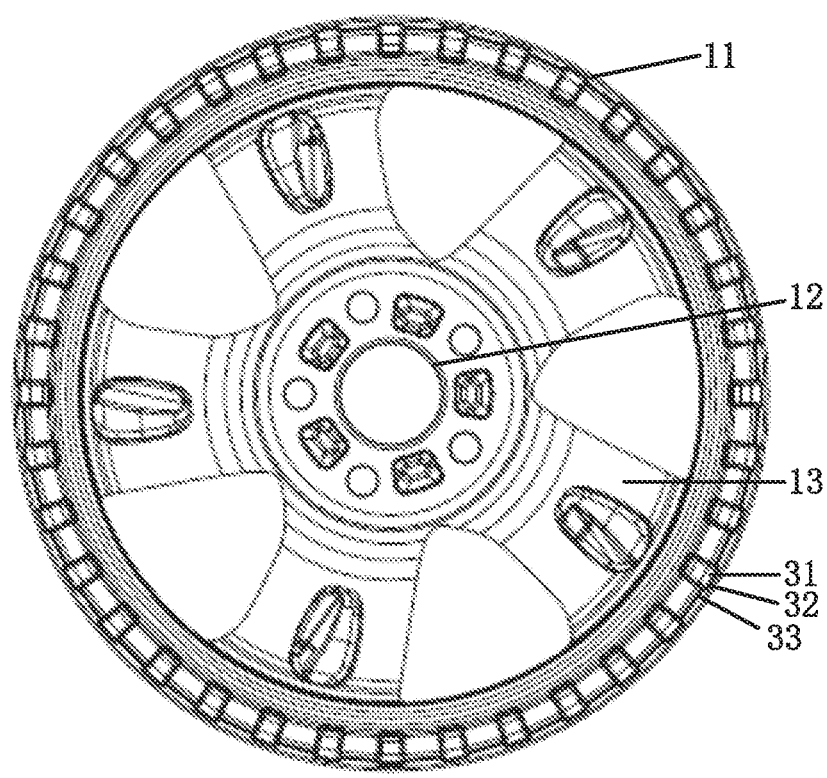
FIG. 3 is a schematic diagram of a back structure of the wheel according to first embodiment of the disclosure.
Figure 4:
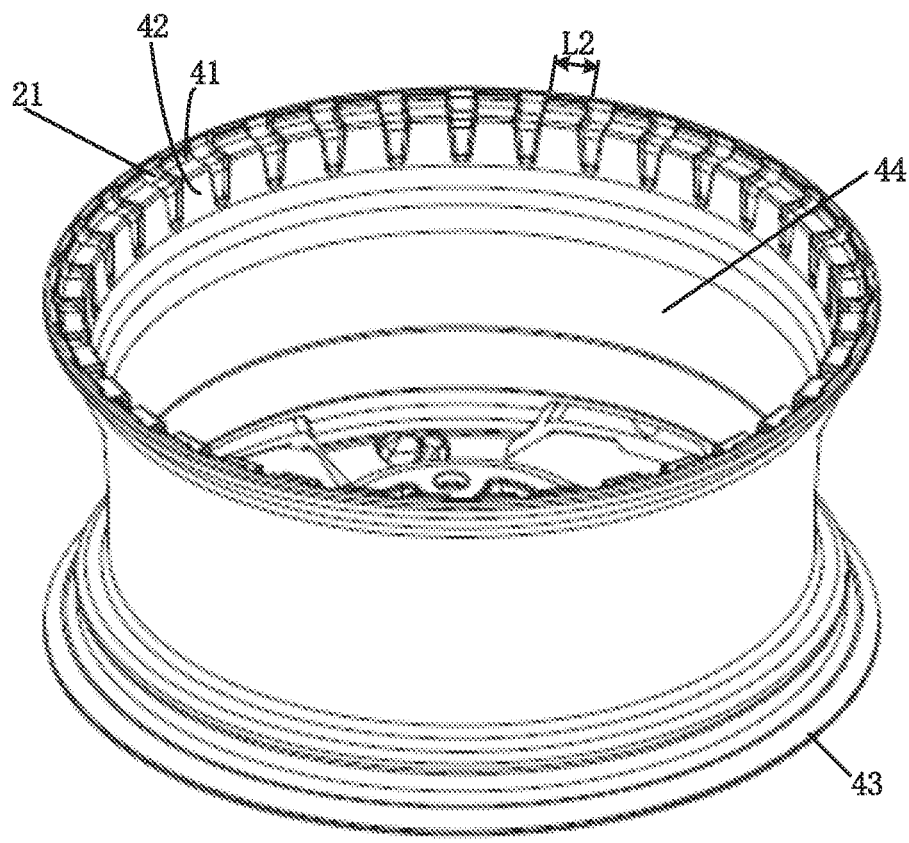
FIG. 4 is a three-dimensional structure diagram of the wheel according to first embodiment of the disclosure.

Provided in the present embodiment is a motor vehicle aluminum alloy hub with an inner flange 26 having weight reduction sockets 21. The hub includes a wheel disc and a rim 11, and the wheel disc includes a flange plate 12, a flange plate periphery portion and spokes 13. The inner flange 26 of the hub includes weight reduction sockets 21, the strip weight reduction socket unit on the inner flange 26 is as shown in FIG. 2, the weight reduction sockets 21 have a width L of 18 mm, a height H of 34 mm, a draft angle α of 7°, a depth H1 of 3 mm and an internal excessive fillet size of R2 mm, and 36 weight reduction sockets are arranged, on average, on the circumference. In the tests, the weight of the hub is 11.29 kg without weight reduction sockets 21 and is reduced by 0.2 kg with weight reduction sockets 21, and the weight of the hub is reduced by about 1.8%.

Second Embodiment

Various properties of the motor vehicle hub of first embodiment were tested. The strengths and fatigues, including 13-degree impact strength, 90-degree impact strength, radial impact, radial fatigue, bending fatigue and the like, of the above wheel were tested in the test center of Dicastal. The tests show that the hub meets American Wheel Standards of SAE J175 and SAE J328-2005, namely meet the performance requirements for 13-degree impact strength, radial fatigue and bending fatigue, and can also meet the requirements of GB/T 5334-2005 and GB/T 15704-1995 for wheel strengths and fatigues.

The invention claimed is:

1. A rim with a radially inner flange having strip weight reduction sockets, the rim being made of an aluminum alloy and comprising the radially inner flange, a middle portion of the rim and a radially outer flange are annular and are connected end to end to form an annular rim, wherein the strip weight reduction sockets are provided on a radially inner wall of the radially inner flange, a shape of each of the strip weight reduction sockets is a trapezoid; axially outer edges of the strip weight reduction sockets are flush with an edge of the radially inner flange; an axially inner edge of each of the strip weight reduction sockets has fillets; and the strip weight reduction sockets have an axially outer edge length of 5-30 mm, a height of 15-60 mm, an axially inner edge length of 5-15 mm, a base angle of 72-83°, and a depth of 1-5 mm, wherein the strip weight reduction sockets extend from the radially inner flange along an undulation of the rim and reach a flat region of the rim.

2. The rim with the radially inner flange having the strip weight reduction sockets according to claim 1, wherein a distance between the axially outer edges of the strip weight reduction sockets is 15-25 mm.

3. The rim with the radially inner flange having the strip weight reduction sockets according to claim 1, wherein the strip weight reduction sockets are isosceles trapezoids in shape.

4. The rim with the radially inner flange having the strip weight reduction sockets according to claim 1, wherein the strip weight reduction sockets have the axially outer edge length of 18 mm, the height of 34 mm, the axially inner edge length of 8 mm, the base angle of 83°, and the depth of 3 mm.

5. The rim with the radially inner flange having the strip weight reduction sockets according to claim 1, wherein a diameter of the fillets is 2-6 mm.

6. The rim with the radially inner flange having the strip weight reduction sockets according to claim 1, wherein an axially outer surface and an edge of each of the strip weight reduction sockets are connected by a plane.

7. The rim with the radially inner flange having the strip weight reduction sockets according to claim 1, wherein the rim is made of A356.2 aluminum alloy.

8. An aluminum alloy wheel comprising a rim with a radially inner flange having strip weight reduction sockets, the rim being made of an aluminum alloy and comprising the radially inner flange, a middle portion of the rim and a radially outer flange are annular and are connected end to end to form an annular rim, wherein the strip weight reduction sockets are provided on a radially inner wall of the radially inner flange, a shape of each of the strip weight reduction sockets is trapezoidal; axially outer edges of the strip weight reduction sockets are flush with an edge of the radially inner flange; an axially inner edge of each of the strip weight reduction sockets has fillets; and the strip weight reduction sockets have an axially outer edge length of 5-30 mm, a height of 15-60 mm, an axially inner edge length of 5-15 mm, a base angle of 72-83°, and a depth of 1-5 mm, wherein the strip weight reduction sockets extend from the radially inner flange along an undulation of the rim and reach a flat region of the rim.

9. The aluminum alloy wheel according to claim 8, wherein a distance between the axially outer edges of the strip weight reduction sockets is 15-25 mm.

10. The aluminum alloy wheel according to claim 8, wherein the strip weight reduction sockets are isosceles trapezoids in shape.

11. The aluminum alloy wheel according to claim 8, wherein the strip weight reduction sockets have the axially outer edge length of 18 mm, the height of 34 mm, the axially inner edge length of 8 mm, the base angle of 83°, and the depth of 3 mm.

12. The aluminum alloy wheel according to claim 8, wherein a diameter of the fillets is 2-6 mm.

13. The aluminum alloy wheel according to claim 8, wherein an axially outer surface and an edge of each of the strip weight reduction sockets are connected by a plane.

14. The aluminum alloy wheel according to claim 8, wherein the rim is made of A356.2 aluminum alloy.

* * * * *